(12) United States Patent
Schoenfeldt et al.

(10) Patent No.: US 6,326,030 B1
(45) Date of Patent: *Dec. 4, 2001

(54) METHOD FOR PREPARING A NON-FIBROUS POROUS MATERIAL

(75) Inventors: Lars Schoenfeldt, Snekkersten; Peter Sylvest Nielsen, Værløse, both of (DK)

(73) Assignee: Colorplast A/S, Humlebek (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,518
(22) PCT Filed: Dec. 18, 1996
(86) PCT No.: PCT/DK96/00541
  § 371 Date: Jun. 19, 1998
  § 102(e) Date: Jun. 19, 1998
(87) PCT Pub. No.: WO97/22657
  PCT Pub. Date: Jun. 26, 1997

(30) Foreign Application Priority Data

Dec. 19, 1995 (DK) .................................................. 1444/95

(51) Int. Cl.$^7$ ............................... A61K 9/14; A61K 47/30
(52) U.S. Cl. ........................... 424/486; 424/487; 424/488; 514/772.2
(58) Field of Search ................................... 424/486, 487, 424/488; 514/772.2

(56) References Cited

FOREIGN PATENT DOCUMENTS

| | | |
|---|---|---|
| 0 343 459 | 11/1989 | (EP) . |
| 2318 577 A | 10/1996 | (GB) . |
| 73030443 | 3/1973 | (JP) . |
| 1011141 | 1/1989 | (JP) . |
| WO 95/05204 | 2/1995 | (WO) . |

*Primary Examiner*—Thurman K. Page
*Assistant Examiner*—Amy E Pulliam
(74) *Attorney, Agent, or Firm*—Jacobson Holman, PLLC

(57) ABSTRACT

A method for preparing a non-fibrous porous material essentially consisting of one or more hydrophilic polymers and/or pharmaceutical medicaments comprising forming an aqueous solution, sol or gel comprising one or more hydrophilic polymers and/or pharmaceutical medicaments, freezing the solution, sol or gel and extracting the frozen water selectively using a hydrophilic organic solvent being miscible with water at a temperature below 5° C. at which temperature the solvent is not able to dissolve the frozen solutes, leaving the non-fibrous material in a solid, porous form.

6 Claims, 10 Drawing Sheets

METHOD FOR PREPARING A NON-FIBROUS POROUS MATERIAL

BACKGROUND OF THE INVENTION

1. Field of the Invention

The present invention relates to a method for preparing a non-fibrous porous material essentially consisting of one or more hydrophilic polymers and/or pharmaceutical water-soluble medicaments.

2. Description of the Related Art

Non-fibrous porous materials essentially consisting of one or more hydrophilic polymers and/or pharmaceutical water-soluble medicaments and methods for preparing such materials are disclosed in WO 95/05204 and in JP 01-011141.

One method for preparing such products using a hydrous solution of a hydrophilic polymer such as casein, gelatine, collagen, albumin, fibroin, cellulose, starch, agar, sodium carboxyl methyl cellulose, methyl cellulose, polyvinyl alcohol, polyacrylic acid, or polyacrylamide is disclosed in JP 01-011141. According to JP 01-011141, surfactant of non-ionic, cationic, anionic or amphoteric type is added to the hydrous solution and then freeze-drying is carried out. The polymer is dispersed in water to a concentration of 0.05 to 50%, and the surfactant is used in amounts of from 0.5–100%.

Another method or preparing such products using a hydrous solution of a hydrophilic polymer such as a synthetic hydrophilic polymer, a polysaccharide or a biological hydrophilic polymer is disclosed in WO 95/05204. According to WO 95/05204, one or more pharmaceutical medicaments and/or hydrophilic polymers are dissolved in water to provide a solution or a sol, a freeze plate is pre-nucleated by passive condensation or by evaporating or atomising water or the aqueous solution of the pharmaceutical medicaments and/or hydrophilic polymers and/or salts, the solution of one or more pharmaceutical medicaments and/or hydrophilic polymers is provided on the pre-nucleated freeze plate, the temperature of which is to be kept below the freezing point of the atomised water or solution, the solution is frozen to provide an ice sheet comprising the pre-nucleated frozen material, the sheet is freeze dried, and the resulting sheet is optionally cut into pieces of suitable sizes.

Freeze drying is a time-consuming process and is therefor often a bottle-neck in a production line, it has high requirements of capital and is a highly energy-consuming process. Thus, there is an incentive to try to circumvent freeze drying if possible.

EP 343 456 discloses dehydrating of macromolecular substances by freezing a hydrated gel or sol which is then immersed and thawed in a hydrophilic solvent generally at a temperature above +5° C. Such process is not suitable for dehydrating frozen solutions of macromolecular substances being easy to redissolve in water and would not permit the obtaining of a controlled porous structure.

It has now surprisingly been found that it is possible to avoid the freeze drying when removing water from frozen solutions of various solutes, especially from frozen solutions of non-fibrous porous materials essentially consisting of one or more hydrophilic polymers and/or pharmaceutical medicaments and to preserve a controlled microporous structure.

BRIEF DESCRIPTION OF THE DRAWINGS

The invention is illustratively disclosed more in detail with reference to the drawings in which.

BRIEF SUMMARY OF THE INVENTION

Figure 1:
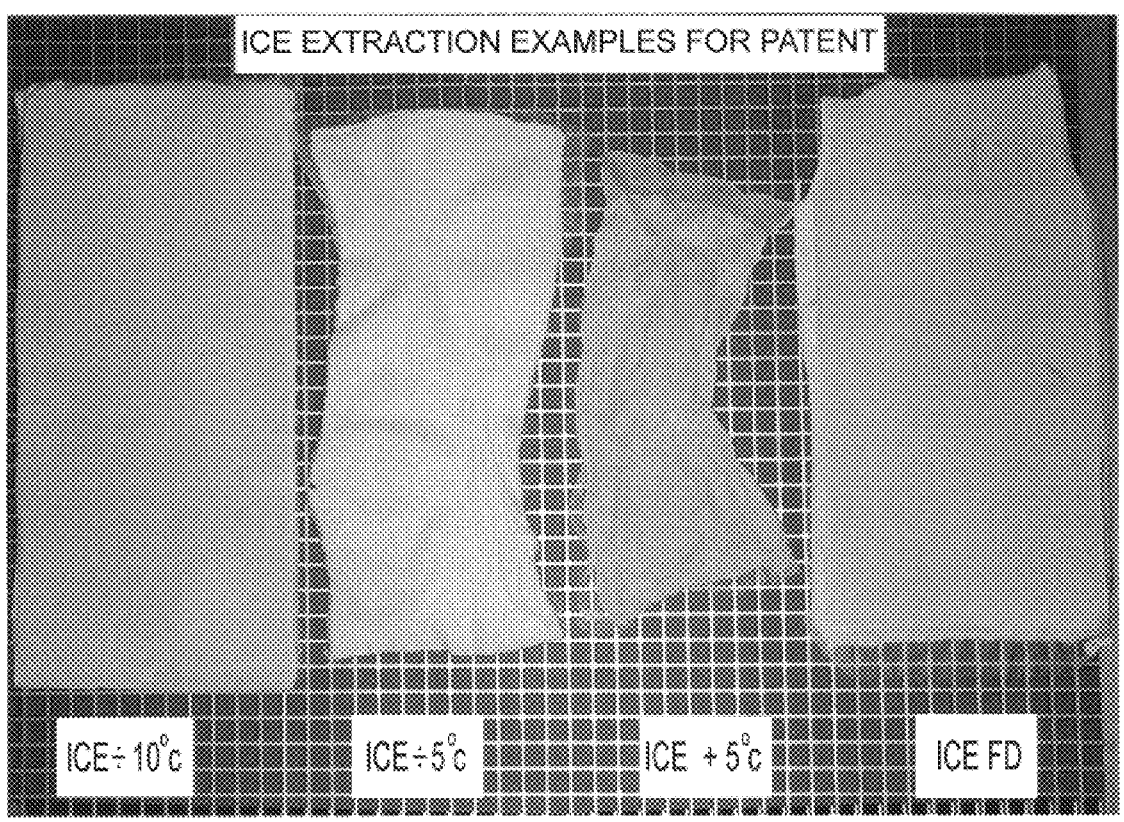
FIG. 1 shows a photograph of four sheets made by freezing an aqueous solution, comprising a sodium alginate and extracting the frozen water selectively using ethanol at −10° C., −5° C. and +5° C. and by freeze drying, respectively.
Figure 2:
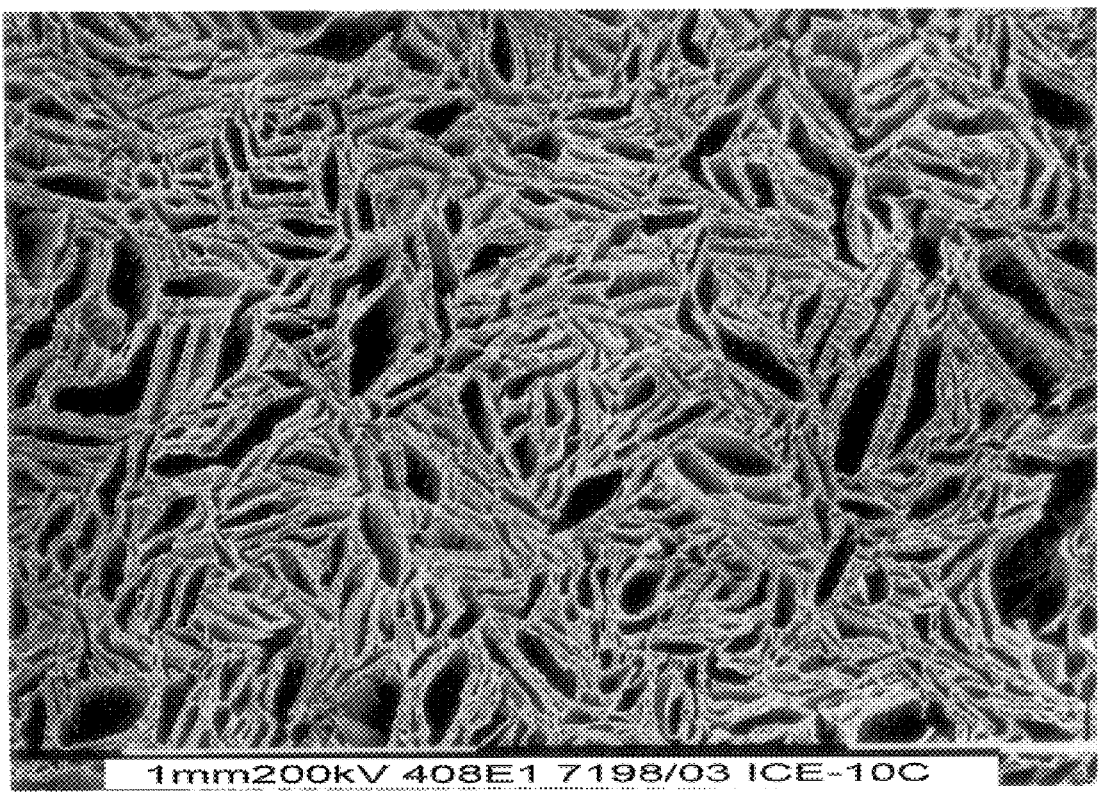
FIG. 2 shows a SEM photograph of the surface of sheet No. IS −10° C. of FIG. 1 extracted at −10° C.
Figure 3:
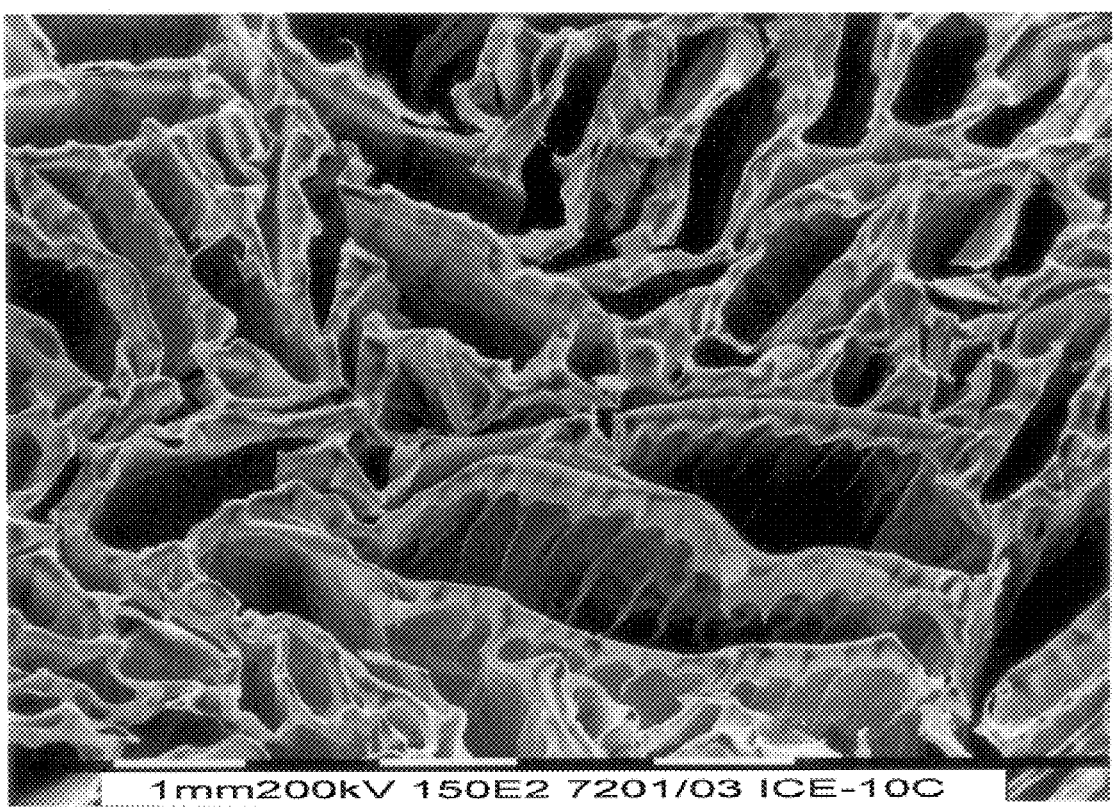
FIG. 3 shows a SEM photograph of the surface of sheet No. IS −10° C. of FIG. 1 extracted at −10° C. in a greater magnification.

The present invention relates, in its broadest aspect, to a method for removing frozen water from a frozen solution, sol or gel of various solutes or solubilised components, especially from frozen solutions of non-fibrous porous materials essentially consisting of one or more hydrophilic polymers and/or pharmaceutical medicaments by extraction with a solvent able to "dissolve" frozen water under conditions leaving the solutes or solubilised components in an essentially unchanged solid state. In principle, the method is applicable for all materials being soluble or which may be solubilised in water, but not being soluble in another solvent or solution being liquid at the relevant temperatures for removing the water from the frozen aqueous solution.

DETAILED DESCRIPTION OF THE INVENTION

In one aspect, the invention relates to a method for preparing a non-fibrous porous material essentially consisting of one or more hydrophilic polymers and/or pharmaceutical medicaments comprising forming an aqueous solution, sol or gel comprising one or more hydrophilic polymers and/or pharmaceutical medicaments, freezing the solution and extracting the frozen water selectively using a hydrophilic organic solvent being miscible with water at a temperature below 5° C. at which temperature the solvent is not able to dissolve the solutes, leaving the non-fibrous porous material in a solid, porous form.

The freezing of the solution, sol or gel may be carried out at a temperature of from −100 to −5° C. Preferably, the freezing is carried out at a temperature from −75 to −15° C., more preferred at a temperature from −30 to −20° C.

The hydrophilic organic solvent being miscible with water but not being able to dissolve the solutes is preferably a lower molecular weight straight or branched or cyclic aliphatic mono or divalent alcohol such as methanol, ethanol, propanol or cyclohexanol or ethylene glycol or propylene glycol or an aromatic mono or dialcohol such as benzyl alcohol or phenol or a hydroxyl phenol or a ketone such as acetone or ethyl methyl ketone.

In one embodiment of the invention, one or more hydrophilic polymers and/or pharmaceutical medicaments is/are dissolved in water to provide a solution or sol, a freeze plate is pre-nucleated, the solution of one or more pharmaceutical medicaments and/or hydrophilic polymers is provided on the pre-nucleated freeze plate, the temperature of which is to be kept below the freezing point of the water or solution, the solution is frozen to provide an ice plate comprising the pre-nucleated frozen material and the water is extracted selectively using a hydrophilic organic solvent miscible with water at a temperature below 5° C. at which temperature the solvent is not able to dissolve the solutes, leaving the non-fibrous porous material in a solid, porous form.

The freeze plate may, according to the invention, e.g., be pre-nucleated by passive condensation or by evaporating or atomising water or the aqueous solution of the pharmaceutical medicaments and/or hydrophilic polymers and/or salts.

The aqueous solution to be frozen comprises preferably one or more hydrophilic polymers selected from polyvinyl pyrrolidone (PVP); polyvinyl alcohol (PVA); polyacrylic acids; polyacrylic amide acids; polyethylene oxides, polypropylene oxides or copolymers thereof; copolymers of polymethyl vinyl ether and maleic anhydride; collagen; gelatine; and polysaccharides such as chitin/chitosan; starches; alginates; pectin/pectat; gallan; carregenans; glycomannan; Guar gum; and locust bean gum; cellulose derivatives, e.g. sodium carboxymethyl cellulose, hydroxyethyl cellulose, or hydroxypropyl cellulose; proteoglycaneslglycosamino glycanes, e.g. hyaluronic acid, or chondroitin sulfphate.

It is preferred that the solution to be frozen comprises one or more polysaccharides which may give rise to the formation of a non-fibrous material in the ice sheet after the water has started freezing as a pure phase.

The polysaccharide(s) is/are preferably alginate in the form of a sodium alginate or a mixture of sodium and calcium alginates.

In one embodiment of the invention both an exchange of ions and extraction of frozen water is carried out as a combined step. This ensures that the ion exchange rendering the frozen solution insoluble in water takes place simultaneously with the extraction.

The extraction may be carried out at any temperature at which the solvent is not able to dissolve the frozen solutes, leaving the solutes in a solid, porous form. The extraction is generally carried out at a temperature below the freezing point of pure water, and below the initial melting point of the frozen solutes, more preferred at a temperature of −5° C. or below, most preferred a temperature of −10° C. or below.

The degree of ion exchange may optionally be increased by performing a separate further step in which the sheet is wetted with a solution comprising the desired ions in the same manner as disclosed in WO 95/05204.

The initial melting temperature of the frozen solutes is considered the temperature at which the slope of a plot the heat capacity of the frozen material versus the temperature as measured by DSC.

When extracting water from a frozen aqueous sol or solution of sodium alginate, it is preferred to carry out the extraction using ethanol comprising calcium chloride in order to exchange the sodium ions with calcium ions in order to transform the alginate into a form not being soluble in ethanol comprising minor amounts of water.

The extraction is preferably carried out at a temperature below the initial melting temperature $T_i$ of the non-fibrous porous material in order to preserve the structure of the solute, e.g., when preparing non-fibrous porous materials as disclosed in WO 95/05204.

In accordance with another aspect of the invention the solution to be frozen may essentially be based on pharmaceutical medicaments or a mixture of the hydrophilic polymers mentioned above and pharmaceutical medicaments. Suitable pharmaceutical medicaments are for example growth hormones or polypeptide growth factors such as TGF, FGF, PDGF, EGF, IGF-1, IGF-2 and the like.

In accordance with one aspect of the invention the solution to be frozen comprises a cytochine such as growth hormone or a polypeptide growth factor giving rise to the incorporation of such active substances in a form being apt to local application in a wound in which the medicament may exercise its effect on the wound. Cytokines such as growth hormone or polypeptide growth factor may activate local receptors and enhance the wound healing process.

Furthermore, the material produced in accordance with the invention may comprise minor amounts of other medicaments such as bacteriostatic or bactericide compounds, e.g. iodine, iodopovidone complexes, chloramine, chlorhexidine, silver salts, zinc or salts thereof, metronidazol, sulpha drugs, and penicillins, tissue-healing enhancing agents, e.g., RGD tripeptides and the like, enzymes for cleansing of wounds, e.g. pepsin, trypsin and the like, cytotoxic agents and proliferation inhibitors for use in for example surgical insertion of the product in cancer tissue and/or other therapeutic agents which optionally may be used for topical application.

The material produced in accordance with the invention shows the same characteristics and may be used for the same purposes as the materials disclosed in WO 95/05204, e.g. in wound treatment products.

In still another aspect, the invention relates to a method for removing water from an aqueous solution of a solute wherein the solution is frozen and the water is removed by extraction with a solvent miscible with water but not able to dissolve the solutes at the conditions of the extraction.

In one embodiment this method comprises dissolving one or more hydrophilic polymers and/or pharmaceutical medicaments in water to provide a solution or sol, pre-nucleating a freeze plate providing the solution of one or more pharmaceutical medicaments and/or hydrophilic polymers on the pre-nucleated freeze plate, the temperature of which is to be kept below the freezing point of the atomised water or solution, freezing the solution to provide an ice sheet comprising the pre-nucleated frozen material and extracting the water selectively using a solvent being miscible with water but not able to dissolve the solutes, leaving the solutes in a solid, porous form.

The pre-nucleation may be effected by passive condensation or by evaporating or atomising water or the aqueous solution of the pharmaceutical medicaments and/or hydrophilic polymers and/or salts.

The invention also relates to a non-fibrous porous material whenever prepared by a method of the invention.

In the present context growth hormone is intended to designate any growth hormone which is applicable in the non-fibrous porous material produced in accordance with the invention such as human, bovine, ovine, porcine, equine, salmon or tuna growth hormone or analogs or derivatives thereof such as shortened or extended growth hormones such as methionyl growth hormone. A growth hormone is preferably human growth hormone.

Materials and Methods

96% vol. ethanol from Danisco Distillers (D.D.S.F), Copenhagen, Denmark. $CaCl_2.2H_2O$ (3881) from Sigma.

Sorbalg® PH125 sodium alginate from Danisco Ingredients, Brabrand, Denmark. HDPE net H514 from Smith & Nephew, London, UK Experimental Part

EXAMPLE 1

Ice sheets was produced by the following method. A base solution was prepared by dissolving 2.50 g of Sorbalg® PH125 sodium alginate in 97.5 g of distilled. $H_2O$. After storage at 6–8° C. for 10–14 hours the base solution was frozen to an about 4 mm thick ice sheet by the freezing method described in WO 95/05204. A horizontal steel freeze plate was maintained at −20° C. while it was pre-nucleated by spraying droplets of distilled, $H_2O$ onto the freeze plate. When the droplets were frozen—in a layer of about 500 μm—the base solution was poured over the white frost layer and allowed to freeze by a unilateral cooling from the freeze plate at −20° C. The ice sheets were stored at −20° C. until dehydration.

Three solvents were prepared for the Ice Extraction (dehydration) procedure in which the morphology of the sodium alginate in the ice sheets was retained.

|  | Solvent 1 | Solvent 2 | Solvent 3 |
| --- | --- | --- | --- |
| Ethanol 96% v/v | 87.5% wt | 99.0% wt | 100% wt |
| Dist. $H_2O$ | 10.0% wt |  |  |
| $CaCl_2.2H_2O$ | 2.5% wt | 1.0% wt |  |

The extraction was carried out as follows:
1. 100 grams of the ice sheet was immersed in 300 grams of solvent 1 in a Petri dish at −10° C. and frozen in a Gram TFB 245 freezer. The Petri dish was agitated manually every 15 minutes for at least two hours.
2. After the ice was dissolved, the wet sheet was removed from solvent 1. Excessive solvent was allowed to drain off before the wet sheet was immersed in 300 grams of solvent 2 in a Petri dish at ambient temperature. The Petri dish was placed on a shaking table for at least one hour.
3. The procedure under 2 above was repeated using solvent 3.
4. Before drying 70–75% of the solvent was removed using a suction filter.
5. The residual solvent was removed by drying at 60° C. for about thirty minutes.

EXAMPLE 2

A laminate of materials was produced using the same materials and dehydration process as stated as in Example 1. A 2 mm thick layer of the base solution was casted over the white frost. On top of this layer, a HDPE net H514 (Smith & Nephew) was placed before the last 2 mm of base solution was casted over the plate. The last casting should take place before the freezing front reaches the surface of the first casted layer.

EXAMPLE 3

Frozen balls of alginate.

Sodium alginate solution is added dropwise to liquid isobutane at −60° C. (m.p. −145, b.p. −10° C.) and frozen in the form of balls. Isobutane on the frozen balls is evaporated at −10° C. Thereafter, the balls are dehydrated by extraction of ice in the same manner as disclosed in Example 1 leaving porous balls of alginate.

EXAMPLE 4

The experiment of Example 3 is repeated only using liquid nitrogen for the freezing instead of liquid butane.

EXAMPLE 5

Frozen threads or filaments of alginate.

The experiment of Example 3 was changed in that the sodium alginate solution is added by pouring carefully or passing through a die into the liquid isobutane −60° C. (m.p. −145, b.p. −10° C.) and frozen in the form of threads. Thereafter, the threads or filaments are dehydrated by extraction of ice in the same manner as disclosed in Example 1 leaving porous threads of alginate.

EXAMPLE 6

The experiment of Example 5 is repeated only using liquid nitrogen for the freezing instead of liquid butane.

EXAMPLE 7

Four ice sheets were produced by the following method: A base solution was prepared by dissolving of 40.0 g of Sorbalg® PH125 in 1960 g of distilled $H_2O$. The solution was then stored at 6–8° C. for 10–14 hours. After storage the solution ice sheets were produced in the same manner as described in Example 2. In this example the freezing plate temperature was −25° C. and the final dimension of the ice sheets were 18×34×0.4 cm.

Three solvents were prepared for the ice extraction (dehydration).

|  | Solvent 1 | Solvent 2 | Solvent 3 |
| --- | --- | --- | --- |
| Ethanol 96% v/v | 70.0% wt | 99.0% wt | 100% wt |
| Dist. $H_2O$ | 28.0% wt |  |  |
| $CaCl_2$—$2H_2O$ | 2.0% wt | 1.0% wt |  |

Extraction was carried out at three different temperatures and as control a sample was freeze-dried as described in WO95/05204:

| Process temperatures at the ion exchange process | | | | |
| --- | --- | --- | --- | --- |
| Sample No.: | 1 (IS −10) | 2 (IS −5) | 3 (IS +5) | 4 (IS FD) |
| Dehydration process | Ice extraction | Ice extraction | Ice extraction | Freeze drying |
| Solvent 1 | −10° C. | −5° C. | +5° C. | ambient |
| Solvent 2, 3 | ambient | ambient | ambient | ambient |

1. An ice sheet was immersed for 2 hours in solvent 1 in an agitated cryo bath (Heto CB 10) kept at the temperature stated. Solvent 1 was in excess (5–10 kg) ensuring essentially constant concentration during the extraction process.
2. After the ice was dissolved, the wet sheet was drained, washed and dried as described in Example 1 steps 2–5.
3. The control was dehydrated by freeze drying at a pressure of 1 mbar for 20 hours at a shelve temperature of 40° C. After freeze-drying the dehydrated sheet was washed with the three solvents as described above.

Analysis of Morphology of the Samples

Figure 4:
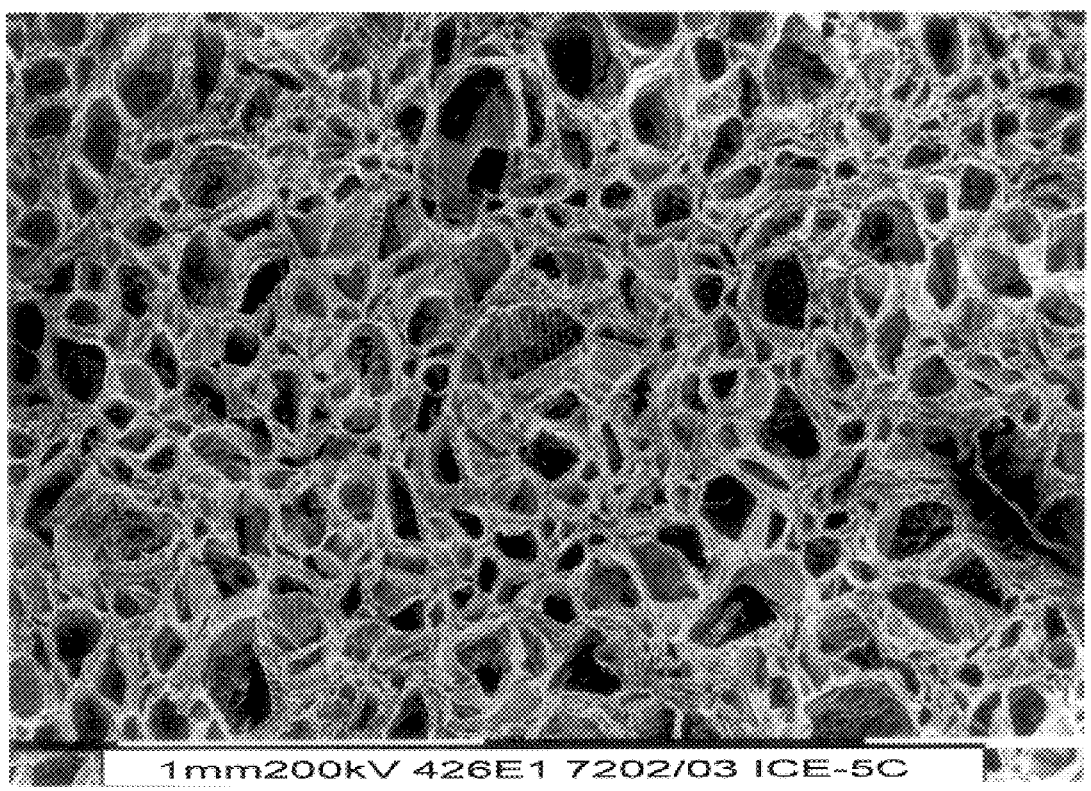
FIG. 4 shows a SEM photograph of the surface of sheet No. IS −5° C. of FIG. 1 extracted at −5° C.
Figure 5:
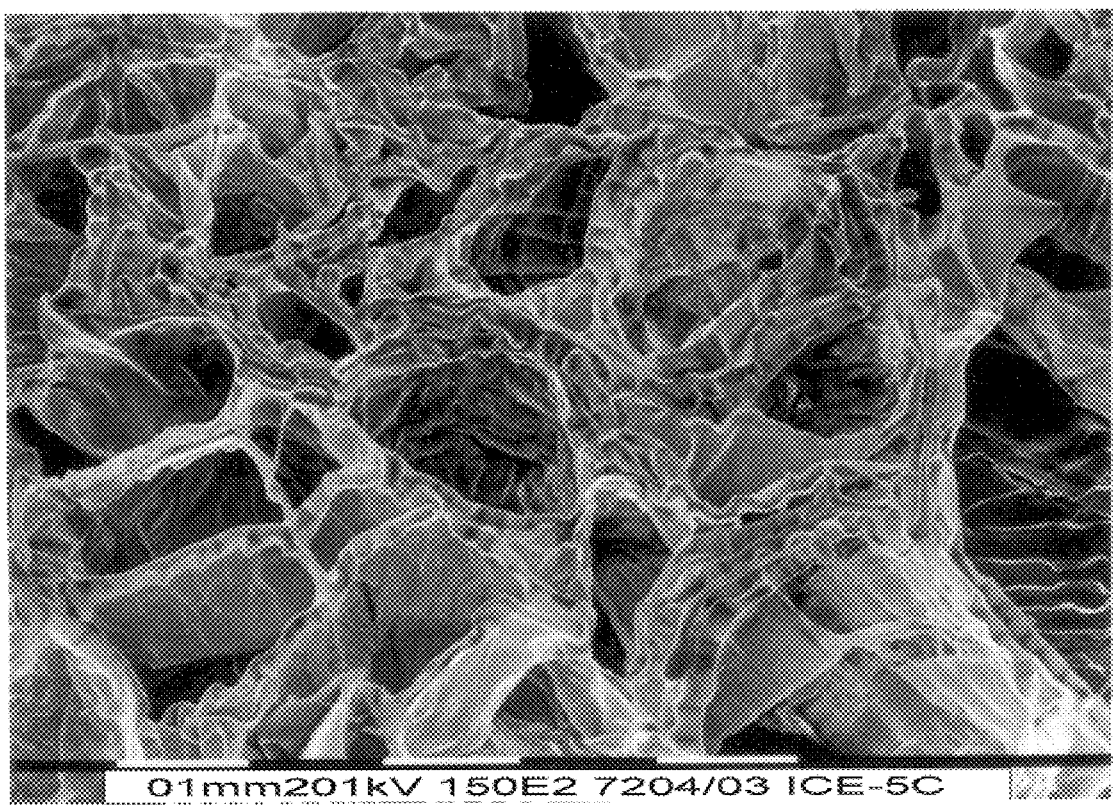
FIG. 5 shows a SEM photograph of the surface of sheet No. IS −5° C. of FIG. 1 extracted at −5° C. in a greater magnification.
Figure 6:
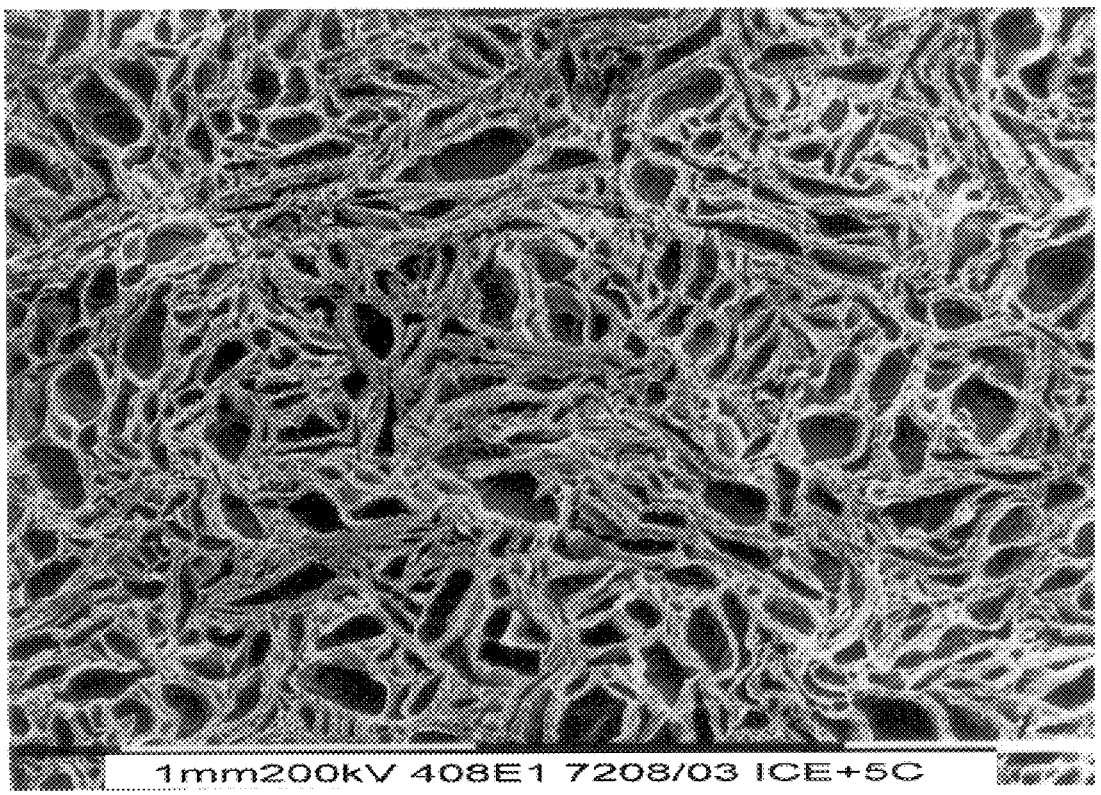
FIG. 6 shows a SEM photograph of the surface of sheet No. IS +5° C. of FIG. 1 extracted at +5° C.
Figure 7:
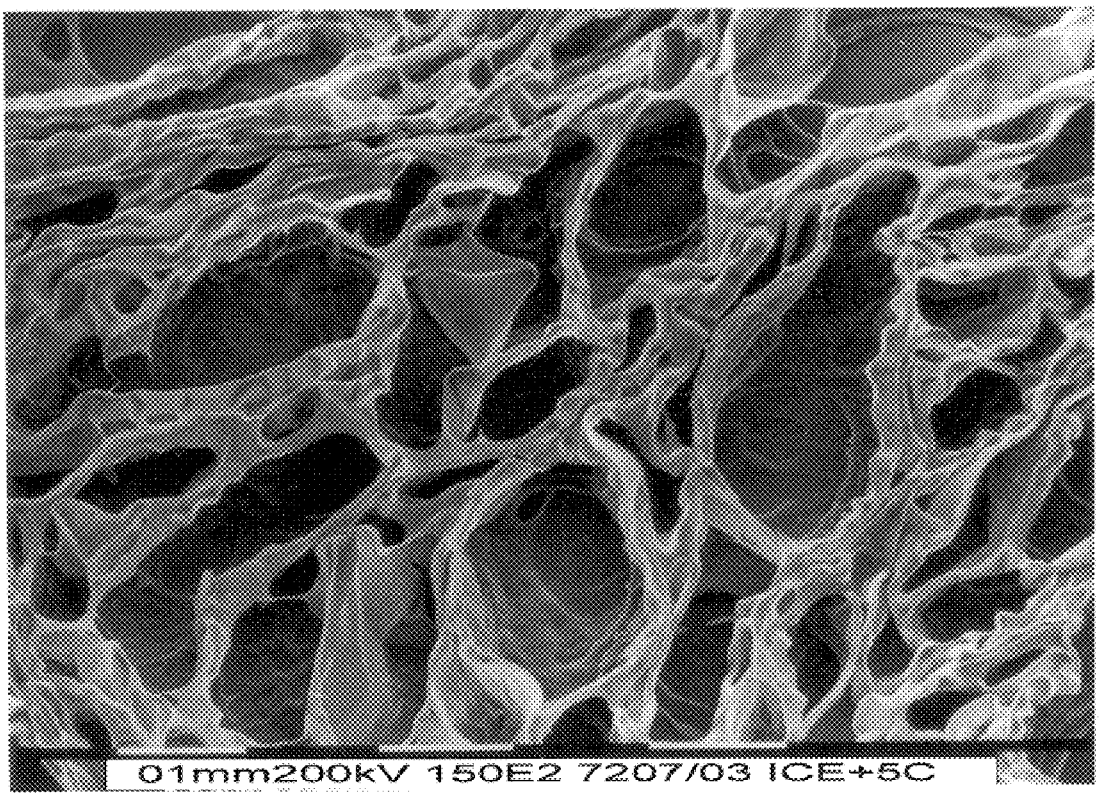
FIG. 7 shows a SEM photograph of the surface of sheet No. IS +5° C. of FIG. 1 extracted at +5° C. in a greater magnification.
Figure 8:
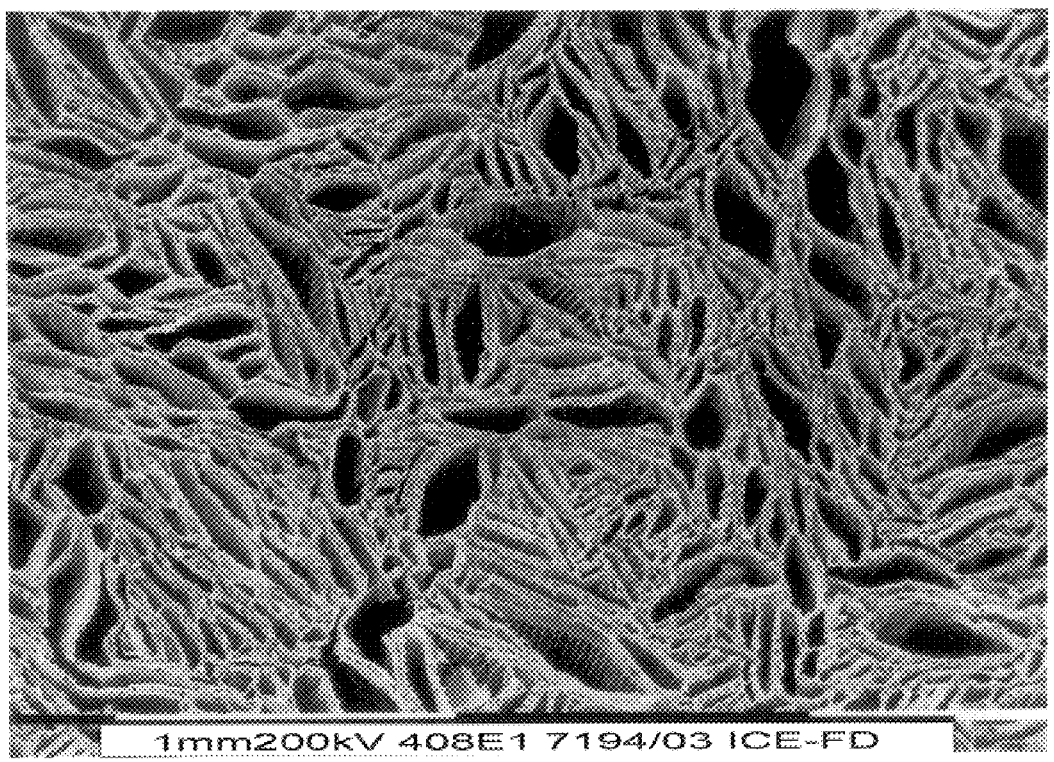
FIG. 8 shows a SEM photograph of the surface of sheet No. IS FD of FIG. 1 dehydrated by freeze drying.
Figure 9:
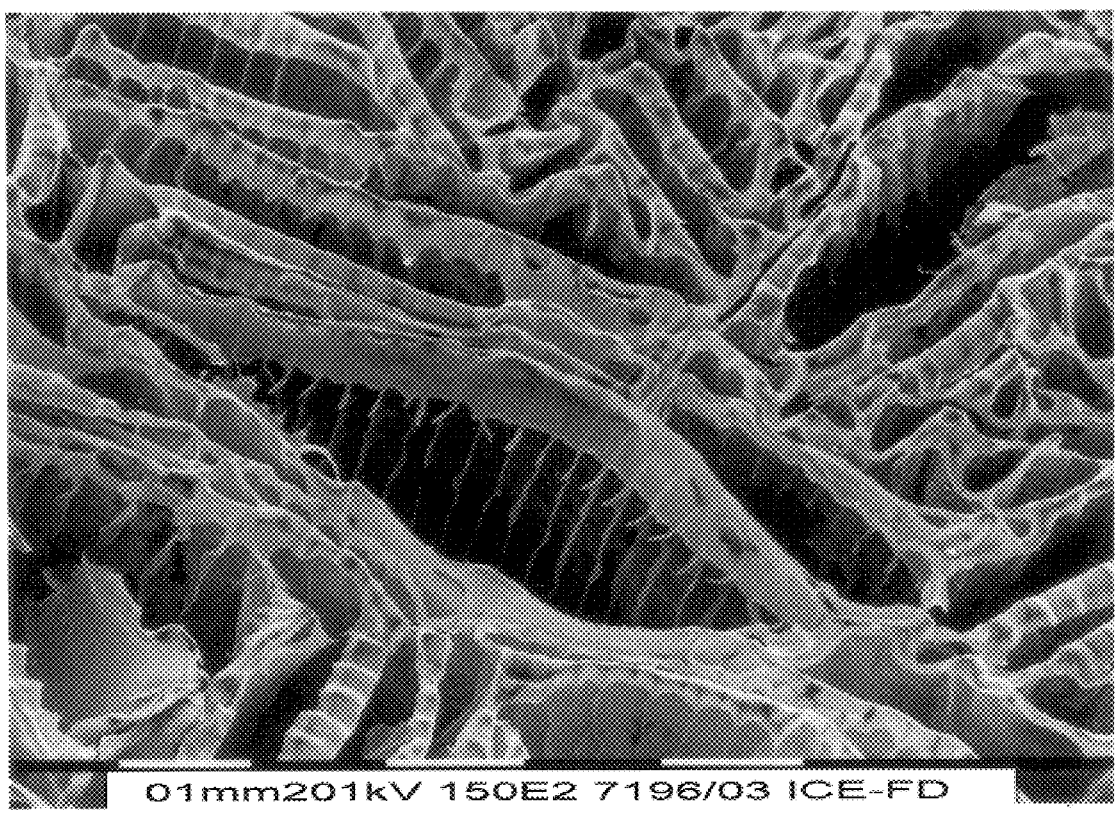
FIG. 9 shows a SEM photograph of the surface of sheet No. IS FD of FIG. 1 dehydrated by freeze drying in a greater magnification.

The shape of the four different samples after dehydration is shown in FIG. 1. The sheet dehydrated by Ice extraction at −10° C. shows the same dimensional stability of the sheet dehydrated by freeze drying whereas the sheet subjected to ice extraction at −5° C. shows distinct shrinkage and the sheet extracted at +5° C. shows excessive shrinkage. This confirmed by the scanning electron micrographs is shown in FIGS. 2–9. FIGS. 2 and 3 and FIGS. 8 and 9 show that the resulting sheets obtained by ice extraction at −10° C. and freeze drying, respectively, are equivalent with respect to morphology and form stability. The structure found is in accordance with the structure disclosed in WO 95/05204 with respect to freeze drying. FIGS. 4 and 5 show that there is a beginning collapsing of the structure when extracting ice at −5° C., and FIGS. 6 and 7 showing that an extensive breakdown of the structure occurs at +5° C.

Determination of Initial Melting Point

Figure 10:
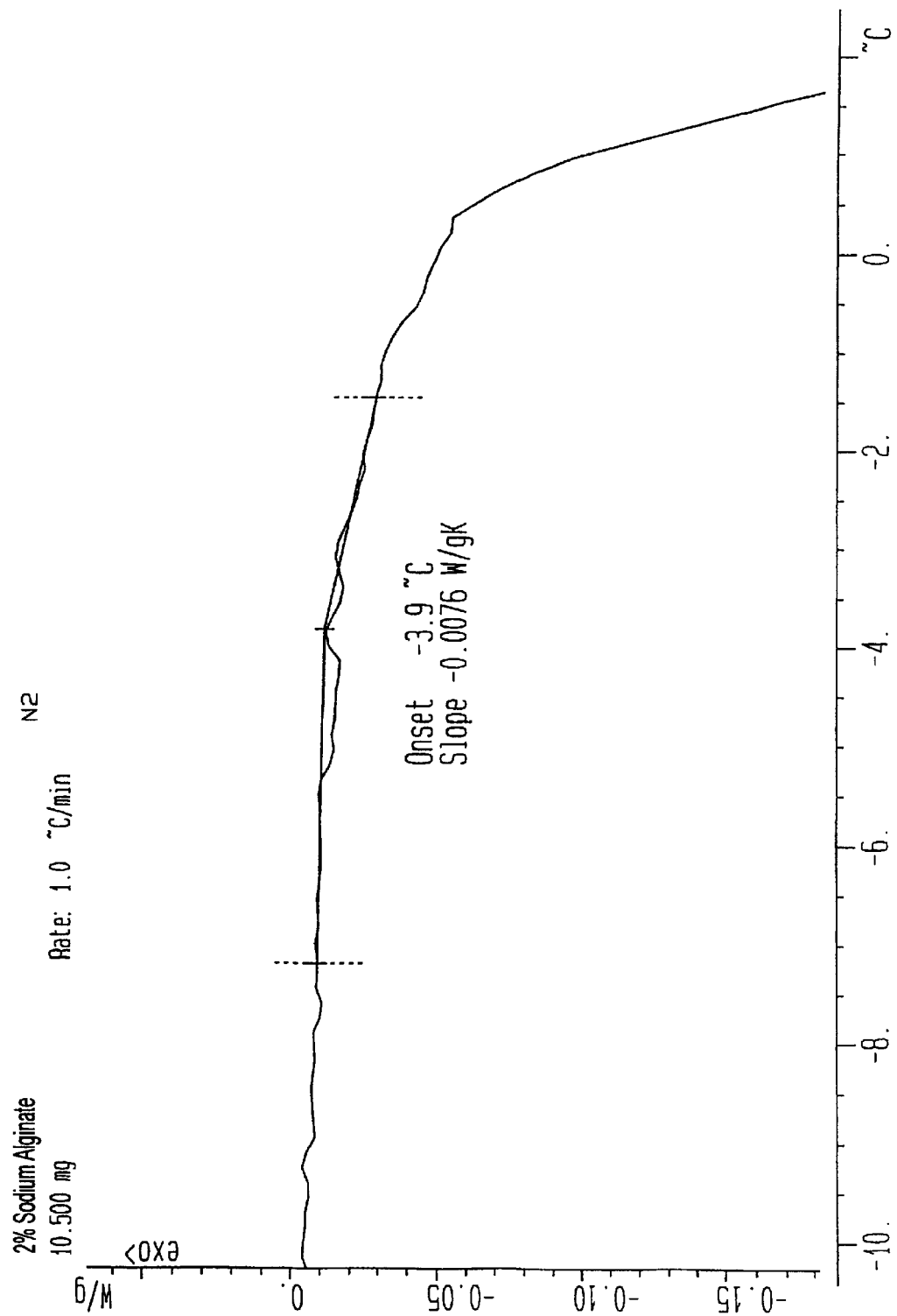
FIG. 10 shows a graphical representation of a DSC scan for determining the melting point of a frozen sheet.

Analysis of the initial melting point ($T_i$) of the frozen polysacchadide solution was carried out by a DSC scan at 1° C./minute from −15 to +2° C. using $N_2$ gas as control. The result appears from FIG. 10. The graph shows an offset melting point at −3.9° C. which has to be corrected by −1.5±0.2° C. giving an initial melting point of $T_i$=−5.4±0.2° C.

The result of the DSC scan is in accordance with analysis of the morphology of the samples show that if the temperature in the ice extraction bath is kept below $T_i$ of the frozen base solution, then extraction of ice using a hydrophilic organic solvent may substitute for freeze drying. At temperatures above $T_i$, ice extraction results in extensive breakdown of the structure, probably due to partial dissolution of the frozen base solution.

What is claimed is:

1. A freeze-drying free method for preparing a non-fibrous porous material essentially consisting of one or more hydrophilic polymers and/or pharmaceutical medicaments and comprising forming an aqueous solution, sol or gel comprising one or more hydrophilic polymers and/or pharmaceutical medicaments, freezing the solution, and, as a combined step, carrying out an ion exchange rendering the frozen solution insoluble in water and extracting the frozen water selectively using a hydrophilic organic solvent miscible with water at a temperature below the freezing point of pure water and below an initial melting point of frozen solutes at which temperature the solvent is not able to dissolve the frozen solutes, leaving the solutes in a solid, porous form.

2. The method as claimed in claim 1 comprising dissolving one or more hydrophilic polymers and/or pharmaceutical medicaments in water to provide a solution, sol or gel, pre-nucleating a freeze plate, providing the solution of one or more hydrophilic polymers and/or pharmaceutical medicaments on the pre-nucleated freeze plate, the temperature of which is kept below the freezing point of the water or the solution, freezing the solution to provide an ice sheet comprising pre-nucleated frozen material, and carrying out an ion exchange rendering the frozen solution insoluble in water and extracting the frozen water selectively using a hydrophilic organic solvent miscible with water at a temperature below the freezing point of pure water and below and initial melting point of frozen solutes at which temperature the solvent is not able to dissolve the frozen solutes, leaving the solutes in a solid, porous form.

3. The method as claimed in claim 2 wherein the aqueous solution to be frozen comprises one or more hydrophilic polymers selected from the group consisting of polyvinyl pyrrolidone (PVP); polyvinyl alcohol (PVA); polyacrylic acids; polyacrylic amide acids; polyethylene oxides; polypropylene oxides and copolymers thereof; copolymers of polymethyl vinyl ether and maleic anhydride; collagen, gelatine; polysaccharides selected from the group consisting of chitin/chitosan; starches; alginates; pectin/pectat; gallan; carregenans; glycomannan; Guar gum; locust bean gum; cellulose derivatives selected from the group consisting of sodium carboxymethyl cellulose, hydroxyethyl cellulose, and hydroxypropyl cellulose; and proteoglycanes/glycosamino glycanes selected from the group consisting of hyaluronic acid, and chordrotitin sulphate.

4. The method as claimed in claim 3 wherein the solution to be frozen comprises one or more polysaccharides.

5. The method as claimed in claim 4 wherein the polysaccharide(s) is alginate in the form of a sodium alginate or a mixture of sodium and calcium alginates.

6. The method as claimed in claim 1 wherein the solution to be frozen comprises a growth hormone or a polypeptide growth factor.

* * * * *

UNITED STATES PATENT AND TRADEMARK OFFICE
CERTIFICATE OF CORRECTION

PATENT NO. : 6,326,030 B1
DATED : December 4, 2001
INVENTOR(S) : Schoenfeldt

It is certified that error appears in the above-identified patent and that said Letters Patent is hereby corrected as shown below:

<u>Title page,</u>
Item [73] correct the name of the Assignee from "Colorplast A/S" to
-- Coloplast A/S --.

Signed and Sealed this

Fourteenth Day of May, 2002

Attest:

JAMES E. ROGAN
*Attesting Officer*    *Director of the United States Patent and Trademark Office*